United States Patent
Hasegawa et al.

(10) Patent No.: US 9,369,761 B2
(45) Date of Patent: Jun. 14, 2016

(54) DISPLAY DEVICE AND PLAY-BACK DEVICE HAVING RESPECTIVE FIRST AND SECOND INTERFACES

(71) Applicant: HITACHI MAXELL, LTD., Osaka (JP)

(72) Inventors: Minoru Hasegawa, Fujisawa (JP);
Nobuaki Kabuto, Kunitachi (JP);
Mayuko Tanaka, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/719,496

(22) Filed: May 22, 2015

(65) Prior Publication Data

US 2015/0256879 A1 Sep. 10, 2015

Related U.S. Application Data

(63) Continuation of application No. 13/644,645, filed on Oct. 4, 2012, now Pat. No. 9,066,058.

(30) Foreign Application Priority Data

Oct. 7, 2011 (JP) .................................. 2011-222454

(51) Int. Cl.
| | |
|---|---|
| *G06F 3/00* | (2006.01) |
| *G06F 5/00* | (2006.01) |
| *G06F 13/12* | (2006.01) |
| *H04N 21/4367* | (2011.01) |
| *H04N 5/76* | (2006.01) |
| *H04N 21/436* | (2011.01) |
| *H04N 21/4363* | (2011.01) |
| *H04N 5/775* | (2006.01) |

(52) U.S. Cl.
CPC ............. *H04N 21/4367* (2013.01); *H04N 5/76* (2013.01); *H04N 5/775* (2013.01); *H04N 21/43615* (2013.01); *H04N 21/43635* (2013.01)

(58) Field of Classification Search
None
See application file for complete search history.

(56) References Cited

U.S. PATENT DOCUMENTS

| | | |
|---|---|---|
| 2009/0002568 A1 | 1/2009 | Konda et al. |
| 2010/0223370 A1 | 9/2010 | Kase et al. |
| 2011/0032425 A1 | 2/2011 | Kamohara |
| 2011/0032426 A1 | 2/2011 | Huang |

FOREIGN PATENT DOCUMENTS

JP 2009-200788 A 9/2009

*Primary Examiner* — David E Martinez
(74) *Attorney, Agent, or Firm* — Baker Botts L.L.P.

(57) ABSTRACT

A display device includes a first interface, a second interface and a display circuit. The display device transmits a first connection confirmation signal to confirm connection, via the first interface to a playback device and receives a response signal in reply to the first connection confirmation signal, transmits a second connection confirmation signal to confirm connection, via the second interface to the playback device and receives a response signal in reply to the second connection confirmation signal, and makes a function to use the first and second interfaces between the display device and the playback device available if both response signals in reply to the first and second connection confirmation signals are received.

11 Claims, 8 Drawing Sheets

FIG.4

|   | Request DLNA Control |
|---|---|
| 0 | DLNA CONCURRENT USAGE STATE QUERY |
| 1 | Reserved |
| 2 | DLNA CONCURRENT USAGE RELEASE REQUEST |
| 3 | DLNA CONCURRENT USAGE START REQUEST |

FIG.5

|   | Report DLNA Control |
|---|---|
| 0 | DLNA CONCURRENT USAGE NOT AVAILABLE |
| 1 | Reserved |
| 2 | DLNA CONCURRENT USAGE AVAILABLE, RELEASE IN PROCESS |
| 3 | DLNA CONCURRENT USAGE AVAILABLE, CONTROL IN PROCESS |

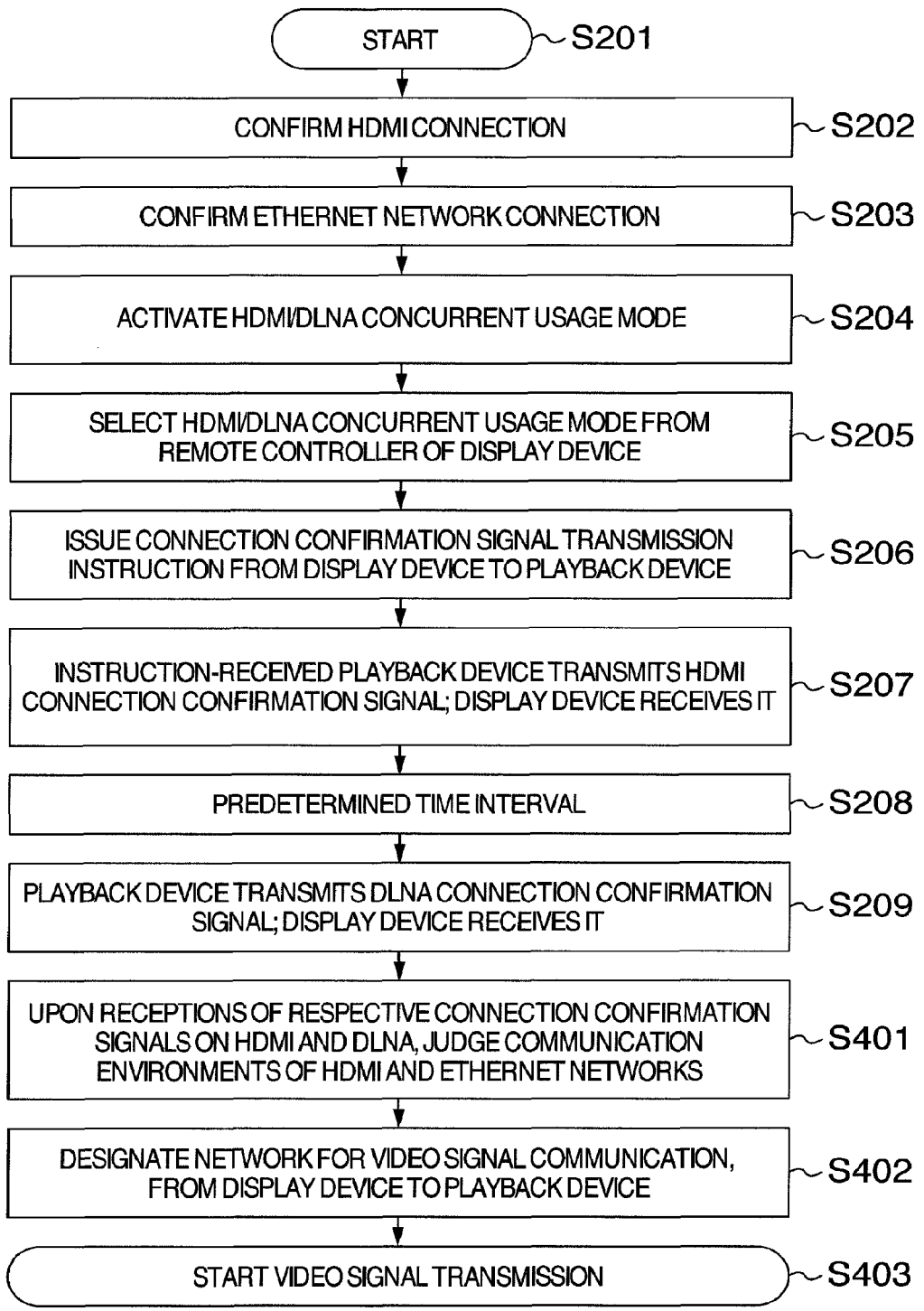

FIG. 8

| Bit / Byte # | 7 | 6 | 5 | 4 | 3 | 2 | 1 | 0 |
|---|---|---|---|---|---|---|---|---|
| 0 | Vender-specific tag code (=3) | | | | Length (=N) | | | |
| 1,2,3 | 24-bit IEEE Registration Identifier (0x00C03) | | | | | | | |
| 4 | A | | | | B | | | |
| 5 | C | | | | D | | | |
| 6 | Supports_AI | DC_48bit | DC_36bit | DC_30bit | DC_Y444 | DLNA_Use | Rsvd (0) | DVI_Dual |
| 7 | Max_TMDS_Clock | | | | | | | |
| 8 | Latency_Fields_Present (0) | I_Latency_Fields_Present (0) | HDMI_Video_Present (0) | Rsvd (0) | CNC3 | CNC2 | CNC1 | CNC0 |
| 9 | DLNA_Play_Position | DLNA_Browse_Hierarchy | DLNA_Search_Program | Rsvd (0) | Rsvd (0) | Rsvd (0) | Rsvd (0) | Rsvd (0) |

FIG. 9

| Bit7 | DLNA_Play_Position |
|---|---|
| 0 | inapplicable |
| 1 | applicable |
| Bit6 | DLNA_Browse_Hierarchy |
| 0 | inapplicable |
| 1 | applicable |
| Bit5 | DLNA_Search |
| 0 | inapplicable |
| 1 | applicable |

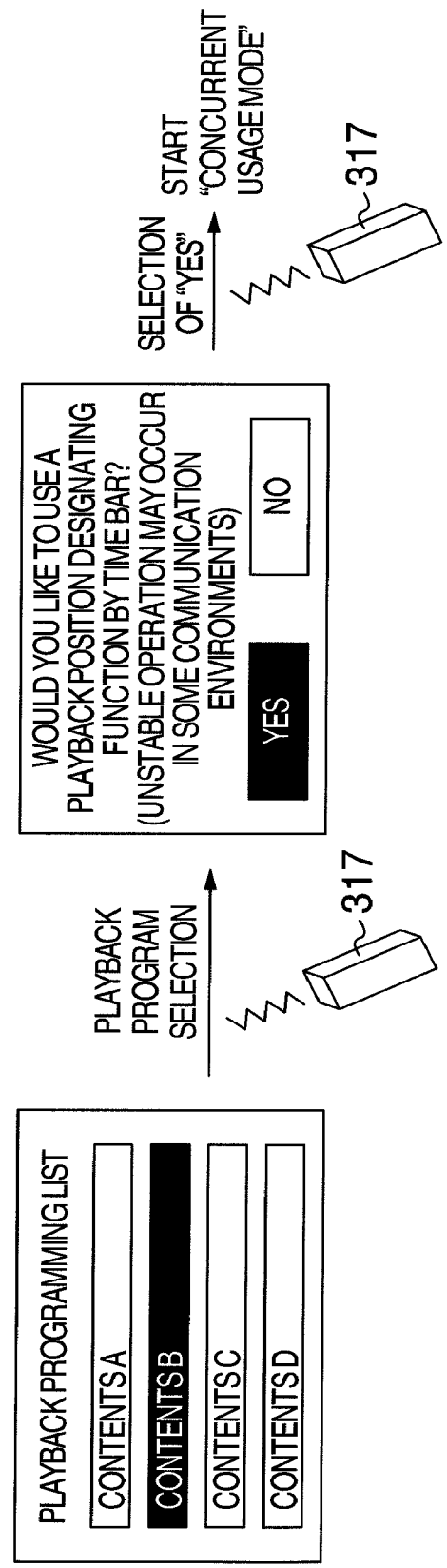

DISPLAY DEVICE AND PLAY-BACK DEVICE HAVING RESPECTIVE FIRST AND SECOND INTERFACES

INCORPORATION BY REFERENCE

The present application is a continuation of U.S. patent application Ser. No. 13/644,645 filed on Oct. 4, 2012, which claims priority to Japanese Patent Application No. 2011-222454 filed on Oct. 7, 2011, the entire contents of each of which are hereby incorporated by reference.

BACKGROUND OF THE INVENTION

The present invention relates to transmission and reception of video signals.

A digital television (TV) set receives a broadcast wave to display an image thereof. In addition, a digital TV set is generally used to receive playback video signals from an external video output device connected via various transmitting units to the digital TV set to thereby display an image of the signals. The High-Definition Multimedia Interface (HDMI; a registered trademark of HDMI Licensing, LLC) is known as an uncompressed digital interface to connect a digital TV set to an external audio-visual signal device. The HDMI includes an interface to transmit signals of the Transition Minimized Differential Signaling (TMDS) as an audio-visual signal transmission scheme and an interface of Consumer Electronics Control (CEC) to transmit device control signals. The Digital Living Network Alliance (DLNA; a registered trademark of Digital Living Network Alliance) to connect a digital TV set via an interface using Ethernet (a registered trademark of Fuji Xerox Co., Ltd.) to an external audio-visual signal device has also come into wide use.

JP-A-2009-200788 describes a technique to solve a problem in which when a digital TV set is connected via HDMI and DLNA to an external audio-visual device, it is not possible to play back contents on DLNA if the band of the network is being used by a second network device. According to the technique, there is provided a receiving device including a network interface and a digital interface to transmit audio-visual data. The receiving device includes a unit to detect an audio-visual transmitting device on a network to connect to the network interface, a unit to detect an audio-visual transmitting device on a network to connect to the digital interface, a receiving unit to receive audio-visual data from the digital interface and audio-visual data from the network interface, and a control unit to control the network interface and the digital interface. The control unit performs control such that even when the audio-visual transmitting device is connected via the network interface, if it is coupled with the digital interface, audio-visual data is received via the digital interface from the audio-visual transmitting device. When the audio-visual transmitting device is not connected to the digital interface and is coupled via the network interface, audio-visual data is received via the network interface.

SUMMARY OF THE INVENTION

However, according to the technique described in JP-A-2009-200788, a situation in which a plurality of devices are connected through a plurality of interfaces and there exists a function feasible only through part of the interfaces has not been taken into consideration. Further, correctness of operation to confirm connections among a plurality of devices has not been taken into consideration.

To remove the problem, there are employed, for example, aspects according to the claims of the present specification.

According to one of the aspects to solve the problem, there is provided a display device to receive video information transmitted from a playback device and to display the video information, including a first interface to communicate information with the playback device, a second interface to communicate information with the playback device, and a display circuit to display video information received by the first interface and/or the second interface, wherein the display device transmits a first connection confirmation signal to confirm connection, via the first interface to the playback device and receives a response signal in reply to the first connection confirmation signal; transmits a second connection confirmation signal to confirm connection, via the second interface to the playback device and receives a response signal in reply to the second connection confirmation signal; and makes a function to use the first interface and the second interface between the display device and the playback device available if the response signal in reply to the first connection confirmation signal and the response signal in reply to the second connection confirmation signal are received.

According to the present invention, when a plurality of devices are connected through a plurality of interfaces, it is possible to improve serviceability for the user.

Other objects, features and advantages of the invention will become apparent from the following description of the embodiments of the invention taken in conjunction with the accompanying drawings.

BRIEF DESCRIPTION OF THE DRAWINGS

FIG. 4 is an explanatory diagram of a message to be set through a message exchange in the embodiment;

FIG. 5 is an explanatory diagram of a message to be set through a message exchange according to the embodiment;

FIG. 7 is a flowchart showing an example of operation according to the embodiment;

FIG. 8 is a diagram showing an example of an Enhanced Extended Display Identification Data (EDID) description of a display device in the embodiment;

FIG. 9 is a diagram showing an example of EDID description of a display device according to the embodiment; and FIG. 10 is a diagram showing an example of a display screen on a display device in the embodiment.

DESCRIPTION OF THE EMBODIMENTS

Figure 1:
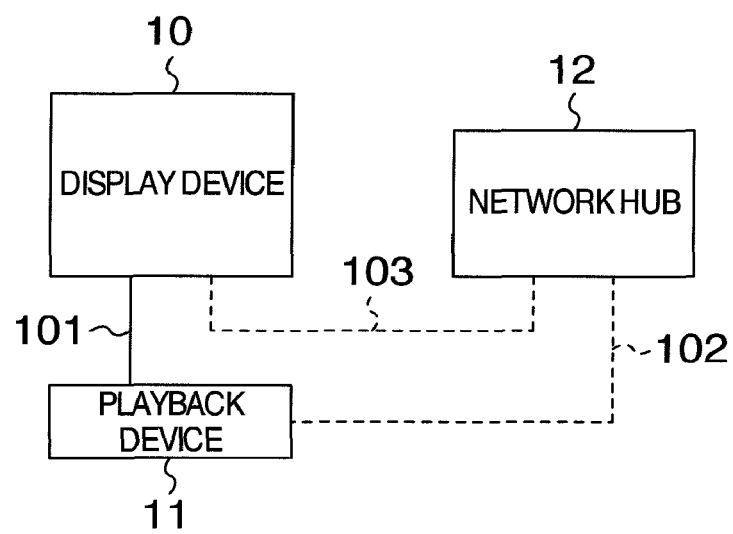
FIG. 1 is a block diagram showing an example of a configuration of a device according to an embodiment.

Next, description will be given of an embodiment. FIG. 1 shows an example of structure of a device according to the present embodiment. A display device 10 such as a TV set is connected via an HDMI cable 101 to a play-back or playback device 11 such as a Blu-Disk (BD) player. The display device 10 connects via an Ethernet cable 103 to a network hub 12, and the playback device 11 connects via an Ethernet cable 102 to the network hub 12. Resultantly, the display device 10 is connected via an Ethernet network to the playback device 11.

In the example of FIG. 1, HDMI and Ethernet are connected to the display device 10 by use of lines from mutually different terminals. However, HDMI also stipulates HDMI Ethernet Channel (HEC) to provide the Ethernet connecting function for an HDMI cable. If the HEC function is provided with the device, HDMI and Ethernet are connected only via an HDMI cable 101 to the device.

As in the configuration of FIG. 1, when a plurality of devices are connected via a plurality of interfaces capable of transmitting control signals, there likely exists a function feasible by use of only part of the interfaces, for example, a function in which a time bar is displayed for a viewer to designate a desired position at which a playback operation is to be started (playback start position designating function) is not stipulated for the HDMI CEC message, but is feasible only by DLNA.

There also exists a problem when confirming connections of a plurality of devices connected via a plurality of interfaces. Specifically, there may take place interference by a malicious intruder from a network and interference from a device with a malfunction.

Figure 6:
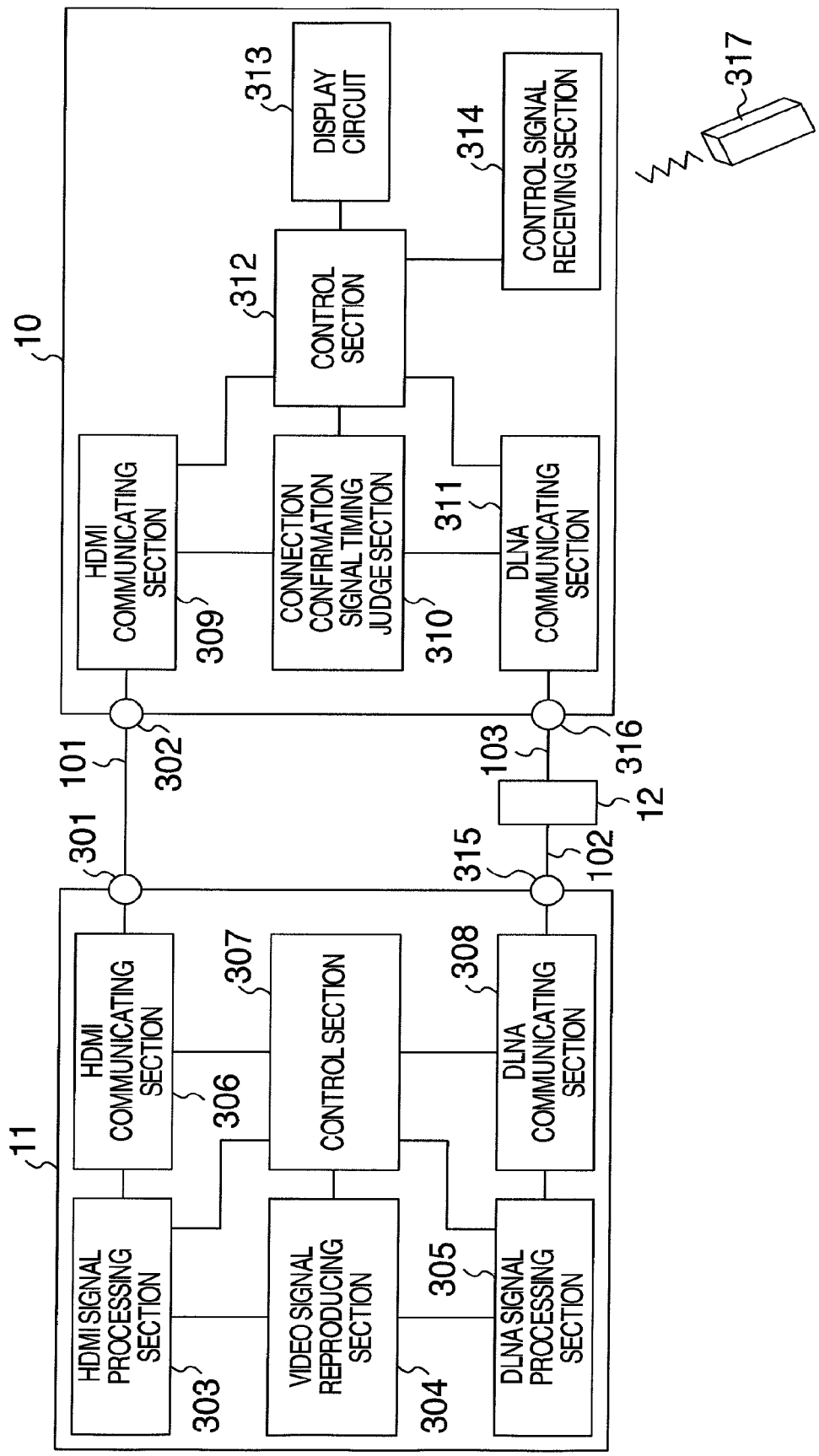
FIG. 6 is a block diagram showing an example of a configuration of a device in the embodiment.

Referring next to FIG. 6, description will be given of the structure of the display device 10 and the playback device 11. In the configuration of FIG. 6, the blocks are not necessarily physically separated from each other. That is, a plurality of functions of some blocks may be implemented by use of one Central Processing Unit (CPU). The configuration of the blocks may be appropriately changed. For example, in the playback device 11, the functions of blocks 303, 305, and 307 may be implemented by one CPU.

The video signal playback section 304 plays back video information recorded in a recording medium, e.g., a Hard Disk Drive (HDD), an optical disk, or a semiconductor memory such as a flash memory; video information included in broadcast signals received via a ground wave, a satellite broadcasting wave, or a satellite wave from an antenna, not shown; and/or video information received via a network. When a recording medium is to be installed in the playback device 11, there may be employed a configuration in which the recording medium is integrally disposed in the playback device, a configuration including a drive unit to which an attachable and detachable recording medium, e.g., an optical disk, a memory card, or a removable hard disk is connectible, or a configuration including the integral memory medium and the drive unit.

The HDMI signal processing section 303 generates a signal (to be referred to as HDMI signal hereinbelow) which can be transmitted via HDMI.

The DLNA signal processing section 305 generates a signal (to be referred to as DLNA signal hereinbelow) which can be transmitted via DLNA.

HDLI communicating sections 306 and 309 communicate HDMI signals respectively via HDMI terminals 301 and 302 with each other.

DLNA communicating sections 308 and 311 communicate DLNA signals respectively via Ethernet terminals 315 and 316 with each other.

The control section 307 controls operation of each constituent block of the playback device 11.

A control signal receiving section 314 receives a signal from a remote control unit 317 to which a user's instruction is inputted. Although FIG. 6 includes the remote control unit 317, there may be employed a configuration in which the user inputs an instruction by use of a button installed in the display device 10 or a portable terminal including a remote control function, e.g., a smart phone or a tablet terminal.

A display circuit 313 is a display, e.g., a liquid-crystal display, a plasma display, or an organic ElectroLuminescence (EL) display to display an image based on a video signal inputted thereto.

A control section 312 controls processing of signals sent from the respective sections of the display device 10 and operation of each section thereof.

Processing in a connection confirmation signal timing judge section 310 will be described later.

In the present embodiment, the display device 10 is connected to the playback device 11 by use of the HDMI cable 101 between the HDMI terminals 301 and 302 respectively thereof. The Ethernet terminals 315 and 316 respectively of the display device 10 and the playback device 11 are connected to each other via the network hub 12 by use of the Ethernet cables 102 and 103.

Figure 2:
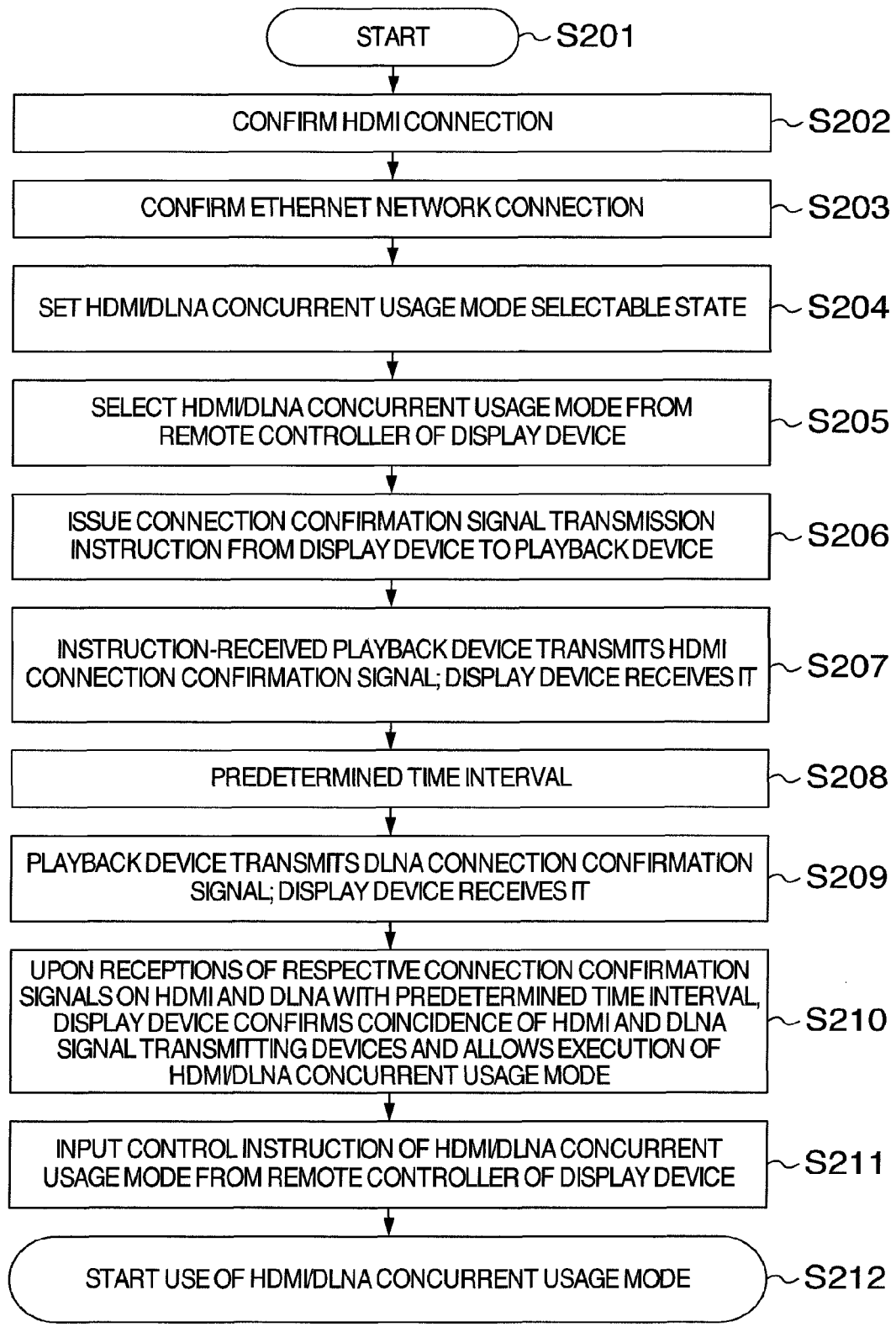
FIG. 2 is a flowchart showing an example of operation in the embodiment.

Referring now to FIG. 2, description will be given of an example of processing in the embodiment. First, the control section 307 confirms, via the HDMI communicating section 306 and the DLNA communicating section 308, a connection on HDMI (to be referred to as HDMI connection hereinbelow) and a connection on DLNA (to be referred to as DLNA connection hereinbelow; S202, S203). These connections may be concurrently confirmed or in a desired order, that is, either one thereof may be first confirmed.

The confirmation of the HDMI connection includes operation in which each of the display device 10 and the playback device 11 confirms performance of its communicating device and sets physical and logical addresses thereof. It is also possible to include confirmation of performance to determine whether or not a mode (to be referred to as a concurrent usage mode hereinbelow) in which the communication of signals via DLNA and that of signals via HDMI are used is available. In the concurrent usage mode, it is not required that the communication via DLNA and the communication via HDMI are carried out all the time. That is, the concurrent usage mode also includes, for example, a state in which these interfaces are alternately used, that is, both of DLNA and HDMI are utilized. In the embodiment below, the operation in which both of DLNA and HDMI are utilized is expressed as "concurrent usage" or "concurrent operation".

The confirmation of the DLNA connection includes confirmation of an IP address. The confirmation of performance to determine whether or not the concurrent usage mode is available may also be included. For this purpose, it is only required to confirm at least either one of the HDMI and DLNA connections.

After the HDMI and DLNA connections are confirmed respectively in steps S202 and S203, there is set a state in which the concurrent usage mode is selectable (S204). In this state, when the user selects by use of the remote control unit 317 of the display device 10 to view on the display device 10 video images sent from the playback device 11 by use of the concurrent usage mode (S205), the control signal receiving section 314 of the display device 10 receives an associated signal from the remote control unit 317. Based on the received signal, the control section 312 sends an instruction via HDMI or DLNA to the playback device 11 to send a connection confirmation signal (S206).

The control section 307 of the playback device 11 instructs the HDMI signal processing section 303 to transmit a connection confirmation signal. The HDMI connection confirmation signal is sent from the HDMI signal processing section 303 via the HDMI communicating section 306 to the display device 10. The connection confirmation signal is then received by the HDMI communicating section 309 of the display device 10 to be delivered to the connection confirmation signal timing judge section 310 (S207).

After a lapse of a predetermined interval of time beforehand set, for example, an interval of time for which the time difference between when the display device 10 starts receiving a first signal and when the display device 10 starts receiving a second signal is 100 msec±10 msec (S208), the control section 307 of the playback device 11 instructs the DLNA signal processing section 305 to transmit a connection confirmation signal. The DLNA connection confirmation signal is transmitted from the DLNA signal processing section 305 via the DLNA communicating section 308 to the display device 10. The connection confirmation signal is then received by the DLNA communicating section 311 of the display device 10 to be fed to the connection confirmation signal timing judge section 310 (S209). When the judge section 310 judges that both of the connection confirmation signals are received conforming to the predetermined interval of time or an interval of time within an allowable range of the predetermined interval of time, it is judged that HDMI and DLNA are connected to one and the same device.

When it is judged that HDMI and DLNA are connected to the same device, the control section 312 of the display device 10 notifies the start of the concurrent usage mode to the respective sections of the display device 10 and the playback device 11 (S210). The user issues a control instruction regarding the concurrent usage mode from, for example, the remote control unit 317 of the display device (S211), to thereby start viewing images of audio-visual signals (S212).

In this fashion, after the connections are confirmed on HDMI and DLNA as the interfaces to connect two devices, the concurrent usage mode is made available. Hence, it is possible that while preventing any unauthorized access from a third party and any erroneous operation, the cooperative control function can be expanded. Further, based on the interval of time between the confirmation of the connection on HDMI and that of the connection on DLNA, whether or not the two devices can be connected is judged, to thereby improve correctness of the judgment.

Figure 3:
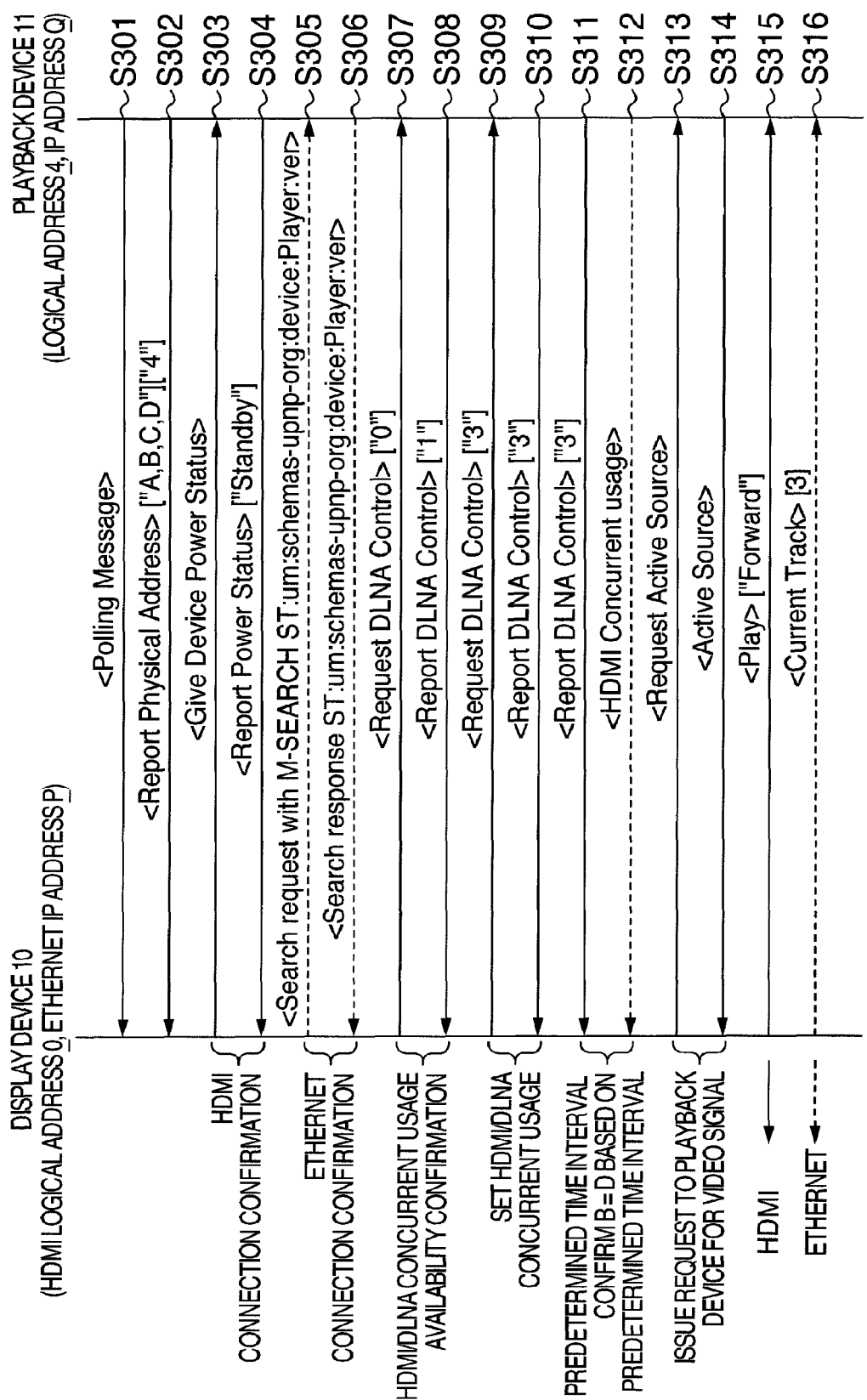
FIG. 3 is an explanatory diagram of a message exchange according to the embodiment.

Referring now to FIG. 3, description will be given of exchanges of a CEC message (a message to be transmitted via the HDMI CEC interface) and a DLNA message (a message to be transmitted via the DLNA interface) in the present embodiment.

When the display device 10 is connected via the HDMI cable to the playback device 11, the control section 307 of the playback device 11 reads, via the HDMI communicating section 306, Enhanced Extended Display Identification Data (EDID) describing characteristic information of the display device 10, to thereby acquire a physical address "A.B.C.D" of the playback device 11.

Next, the control section 307 of the playback device 11 sends a CEC message <Polling Message> to all devices connected to CEC, to confirm whether or not there exists a device having logical address "4" indicating Playback 1 (S301).

The control section 307 of the playback device 11 confirms that no response is received in reply to the CEC message and then acquires logical address "4" as a logical address of the playback device 11. The logical address is described in the header of the CEC message as a logical address which indicates the transmission source and the receiving device of the message.

After the physical and logical addresses are acquired, the control section 307 of the playback device 11 notifies the physical address obtained by <Report Physical Address> and "4" indicating that the device type of the playback device 11 is a playback device, by use of a CEC message via the HDMI communicating section 306 to all devices connected by CEC (S302).

Next, description will be given of an example of the CEC message exchange corresponding to step S202 of FIG. 2. The control section 312 of the display device 10 issues a CEC message <Give Device Power Status> for the power state of the playback device (S303). In response thereto, the control section 307 of the playback device 11 returns a CEC message <Report Power Status> ["Standby"] indicating the standby state (S304).

In this manner, the connection on HDMI is confirmed by exchanging a query message and a response message between the playback device 10 and the display device 11. The messages to be exchanged are not limited to the power state query and its response, but may be any other CEC message such as a message of confirmation for an in-use language setting state.

Description will be given of an example of the DLNA message exchange corresponding to step S203 of FIG. 2 by referring to FIG. 3. The control section 312 of the display device 10 issues a message <Search request with M-SEARCH> stipulated by Universal Plug and Play (UPnP; a registered trademark of UPnP Implementers Corporation) onto the Ethernet for each device with a player function on Ethernet (S305). In response thereto, the playback device 11 returns a message <Search response> onto Ethernet, resulting in confirmation of the connection on Ethernet (S306).

Referring to FIG. 3, description will be given of an example of the message exchange corresponding to step S204 of FIG. 2. The control section 312 of the display device 10 transmits a CEC message <Request DLNA Control> ["0"] for the state of the concurrent usage mode to the playback device 11 (S307). In reply thereto, the control section 307 of the playback device 11 sends a CEC message <Report DLNA Control> indicating a response regarding the concurrent usage mode to the display device 10 (S308). Through the message exchange, whether or not HDMI and DLNA can be concurrently used is confirmed. The confirmation may be carried out as one step of the HDMI connection confirmation step S202. The contents of <Request DLNA Control> and <Report DLNA Control> will be specifically described later by referring to FIGS. 4 and 5.

The CEC messages <Request DLNA Control> and <Report DLNA Control> may be defined as the standard or as a vender inherent message <Vender Command>. When they are defined as the standard, the processing described in the present embodiment is feasible even when the display device 10 and the playback device 11 are made by mutually different producers.

FIG. 4 shows an example of the CEC message <Request DLNA Control>. In the example, "0" indicates a query for the HDMI and DLNA concurrent usage state and does not request any change in the concurrent usage state. "1" indicates that the field is reserved for future. "2" indicates a request for the release of the concurrent usage mode. "3" indicates a request for the start of the concurrent usage mode. An argument may be assigned to each DLNA message available in the concurrent usage mode. Or, it is also possible to classify the DLNA messages into several message groups such that an argument is assigned to each message group, to thereby control availability thereof in the concurrent usage mode.

FIG. 5 shows an example of the CEC message <Report DLNA Control>. In the message, "0" indicates that the concurrent usage mode cannot be executed. "1" indicates that the field is reserved for future use. "2" and "3" indicate that the concurrent usage mode can be coped with. Further, "2" indicates that the release operation is in process or the concurrent usage mode is temporarily unavailable and "3" indicates that the operation is under control of the concurrent usage mode. By assigning the arguments as above, when each argument is represented in binary notation, bit 0 indicates availability of the concurrent usage mode and bit 1 indicates whether or not the concurrent usage mode can be coped with. This makes it possible to construct a simple system in which erroneous operations are prevented.

As for arguments of FIG. 4, in a situation in which an argument is assigned to each DLNA message available in the concurrent usage mode or in which the DLNA messages are classified into several message groups such that an argument is assigned to each message group to control availability thereof in the concurrent usage mode, it will be convenient to dispose the arguments of FIG. 5 in association therewith.

Referring to FIG. 3, description will be given of an example of the message exchange corresponding to step S206. The control section 312 of the display device 10 sends a CEC message <Request DLNA Control> ["3"] via the HDMI communicating section 309 to request the start of the concurrent usage mode (S309). When the signal is received via the HDMI communicating section 306, the playback device 11 activates or starts the concurrent usage mode and returns a CEC message <Report DLNA Control> ["3"] to notify that the concurrent usage mode is set (S310).

Description will next be given of an example of the message exchange corresponding to steps S207 to S210 of FIG. 3. The control section 307 of the playback device 11 sends again a CEC message <Request DLNA Control> ["3"] via the HDMI communicating section 306 (step S311 of FIG. 3, step S207 of FIG. 2). Step S310 may be employed for the operation by removing the CEC message of step S311. However, when it is required, at reception of the message of step S310 by the display device 10, to make a transition to the reception standby state of steps S311 and S312, the CEC message <Request DLNA Control> ["3"] is transmitted twice, that is, separately for each of steps S311 and S312.

Further, after a lapse of the predetermined period of time, e.g., 100 msec±10 msec (step S208 of FIG. 2), the control section 307 of the playback device 11 sends a DLNA message <HDMI Concurrent usage> via Ethernet (step S312 of FIG. 3, step S209 of FIG. 2). The DLNA message <HDMI Concurrent usage> is stipulated as a message to indicate that a device which connects to HDMI is concurrently connects to DLNA, too.

Based on an event in which the interval of time between the reception of the DLNA message <HDMI Concurrent usage> in step S312 and that of the CEC message <Report DLNA Control> ["3"] in step S311 conforms to the predetermined interval of time 100 msec±10 msec, the display device 10 recognizes that HDLI and DLNA are connected to one and the same playback device and allows the subsequent operation to be conducted in the concurrent usage mode (step S210 of FIG. 2).

The display device 10 judges by use of a combination of the CEC and DLNA messages that it is connected to one and the same playback device. Hence, it is possible to obtain information of the correspondence between the HDMI logical address and the IP address contained in the header of each of the CEC and DLNA messages.

When the message transmission and reception interval of time is defined based on the points of transmission start timing of both messages, there is obtained an upside that the control operation is facilitated on the transmission side. When the interval of time is defined based on the point of end timing of a preceding message and the point of start timing of a succeeding message following the preceding message, there is obtained an upside that the operation to measure the interval of time is simplified on the reception side. When the points of end timing of both messages are employed for the definition, it is required to measure the interval of time only if both messages are correctly received. As a result, the measurement is advantageously conducted in an appropriate period of time without using any undesired period of time for the measurement. Any one of the definitions may be adopted only if the measurement timing is beforehand designated. Also, the measurement timing may be changed according to the communication environments.

Referring to FIG. 3, description will be given of an example of the message exchanged in step S212 and subsequent steps shown in FIG. 2. The control section 312 of the display device 10 sends a CEC message <Request Active Source> requesting video signals to the playback device 11 (S313). In response thereto, the control section 307 of the playback device 11 returns a CEC message <Active Source> (S314) to start outputting video signals and then starts outputting video signals. For actual content viewing control, the control section 312 of the display device 10 sends a CEC message <Play> ["Forward"] (S315) for fast playback and then starts video playback. The control section 312 of the display device 10 then transmits a DLNA message <Concurrent Track> designating a playback position (S316). The playback device jumps to the designated playback position to start playing back video signals.

Even when the confirmation method of confirming that HDMI and DLNA are connected to one and the same device according to the present embodiment is employed, another confirmation method may also be used. That is, the confirmation method of the present embodiment is compatible with any other confirmation method. By additionally using a second confirmation method, it is possible to heighten precision in the confirmation of the connections of HDMI and DLNA to one and the same device. In such second confirmation method, messages may be exchanged, for example, immediately before step S309 of FIG. 3.

The signals to confirm the connection are not limited to those of the present embodiment described above. Any signals capable of confirming the connection may be employed.

Description will be given of an example of processing executed by use of the concurrent usage mode. When using the concurrent usage mode in which only the playback start position designating function of the DLNA function is employed and the other control operations and video signal transmission are conducted according to HDMI, the user notifies an associated control signal, for example, from the remote control unit to the control signal receiving section 314 of the display device 10.

The control signal receiving section 314 sends information of the control signal to the control section 312. The control section 312 feeds the information regarding the playback start position to the DLNA communicating section 311 of the display device 10 and information other than the playback start position to the HDMI communicating section 309.

The DLNA communicating section 311 outputs the information regarding the playback start position as a DLNA message from the Ethernet terminal 316. The information is sent via the LAN cable 103, the hub 12, and the LAN cable 102 to be inputted to the Ethernet terminal 315. When the DLNA message is received from the Ethernet terminal 315, the DLNA communicating section 308 delivers the DLNA message to the control section 307.

The HDMI communicating section 309 sends the information other than the playback start position via the HDMI terminal 302 and a CEC line of the HDMI cable 101 to the HDMI terminal 301. When the information is received via the HDMI terminal 301, the HDMI communicating section 306 transfers the information to the control section 307.

When the information is received via DLNA and HDMI, the control section 307 instructs the HDMI signal processing section 303 to create and to transmit HDMI video signals according to the information thus received. The video signals are transmitted via HDMI to the display circuit 313, to thereby display video images.

Description will now be given of the "predetermined interval of time" in detail. It is desirable that the predetermined interval of time is set shorter, since the shorter time interval makes it more difficult for any other device connected to the network to transmit a false connection confirmation signal during such shorter time interval. However, there may exist a factor, for example, which lowers the communication speed on each interface. Therefore, it is required to set the interval of time in consideration of such factor.

If the predetermined interval of time is equal to or more than one second (sec), the response time for the response to the user is elongated. If the predetermined interval of time is equal to or less than one millisecond (msec), there exists a fear that a collision takes place between messages and the system cannot cope with a delay of a message due to the relay operation. Hence, the predetermined interval of time is favorably equal to or more than one millisecond and equal to or less than one second.

Further, if the tolerance or allowable range is equal to or less than one millisecond, there exists a fear that a collision takes place between messages and the system cannot cope with a delay of a message due to the relay operation. In consideration of immunity against hacking, the upper-most value is at most about 20 msec. As a result, the predetermined interval of time is favorably set to "1 msec to 1000 msec±1 msec to 20 msec". However, the predetermined interval of time of the present invention is not restricted by this example. The present invention is also applicable even when the predetermined interval of time is set to a value other than the values represented as "1 msec to 1000 msec±1 msec to 20 msec", and advantages of the present invention are naturally obtained.

The setting of the predetermined interval of time relies on the communication environments of the respective interfaces between the display device and the playback device. Hence, it is also possible that the communication environments such as communication speeds or rates between the respective interfaces are measured to determine, based on results of the measurement, how much the interval of time between the HDMI connection confirmation signal and the DLNA connection confirmation signal can be minimized. Thereafter, the predetermined interval of time is set according to the communication environments.

When it is desired to change the predetermined interval of time, a CEC or DLNA message to define a new value of the interval of time is favorably transmitted. Or, an argument indicating the predetermined interval of time may be added to a CEC message <Report DLNA Control> ["3"] of step S311. The CEC message is transmitted, according to one aspect thereof, only among the devices connected via HDMI. Since information of the predetermined interval of time is not transmitted to any devices other than the devices connected via HDMI, the connection confirmation is carried out with higher reliability.

In the embodiment described above, the connection confirmation is conducted for HDMI and DLNA in this order. However, the connection confirmation may be conducted first for DLNA and then for HDMI. For the DLNA connection confirmation, the period of time required for communication varies depending on the communication environments in many cases. Hence, if the DLNA connection confirmation is to be first carried out, it is required to set a large value for the tolerance. This deteriorates immunity against unauthorized operations such as hacking. That is, it is desirable to first conduct the HDMI connection confirmation.

In the embodiment, the playback device 11 sends the connection confirmation and then the display device 10 receives the connection confirmation. However, the operation may be carried out in the reverse direction. That is, either one of the playback device 11 and the display device may be the sender or the receiver for the connection confirmation.

It is not required that the connection confirmation is conducted only once for each of HDMI and DLNA. For higher reliability, the connection confirmation may be repeatedly carried out. That is, there may be set a reference for the connection confirmation, for example, "it is required to be judged, by conducting the connection confirmation twice at an interval of time of two seconds, that the interface is connected to one and the same device for two times" or "it is required to be judged, by conducting the connection confirmation four times at an interval of time of one second, that the interface is connected to one and the same device for at least three times". Only if the result of the connection confirmation meets the requirement of the reference, it is allowed to start the HDMI/DLNA concurrent usage mode.

Due to the connection confirmation repeatedly conducted as above, even if a second device, which is coupled with, for example, Ethernet and which is other than the devices using the current usage mode, succeeds by chance in transmitting a false connection confirmation signal only once at appropriate timing, it is more difficult for the second device to transmit a false connection confirmation signal several times at appropriate timing.

In consideration of communication errors, availability of the concurrent usage mode may be judged as below. While the sender transmits pairs of messages transmitted through HDMI and DLNA to the receiver, for example, ten times excepting a situation in which the receiver cannot receive the one of the messages transmitted through HDMI and DLNA, the receiver should receive the message plural times (for example, twice) successively at time intervals to judge that the concurrent usage mode is available. The receiver in concurrent usage mode may remove the concurrent usage mode if one of the messages transmitted through HDMI and DLNA does not arrive five or more of ten times, or if the receiver receives the pair of messages with the interval beyond the designed time plural times (for example, twice) successively excepting a situation in which the receiver cannot receive the one of the messages transmitted through HDMI and DLNA. As a result, even under a communication environment in which a communication error frequently takes place in CEC and/or DLNA messages, it is possible to carry out the communication in a stable state.

It is also possible that for example, while the connection confirmation signal is transmitted via a first interface several times at a predetermined interval of time, numeric information of the predetermined interval of time is notified via a second interface. Further, it is possible that, for example, the connection confirmation signal is transmitted via a first interface three times under a condition in which the time interval between the second and third transmissions is integer times of the time interval between the first and second transmissions, and the integer is notified via a second interface. It may be confirmed that a plurality of interfaces are connected to one and the same device, by using the method in which the connection confirmation signal is transmitted via a first interface and information regarding the communication scheme is notified via a second interface.

In the present embodiment, the control signal regarding the playback start position is communicated via DLNA and the signal of any other information is communicated via HDMI. However, it is also possible to assign a function (e.g., transmission/reception of video signals) which can be accomplished by both of HDMI and DLNA to either one of the interfaces depending on the communication environments of the interfaces.

FIG. 7 shows an example of the processing in which the communication of video signals is selected depending on the communication environments of the interfaces. Steps S201 to S209 are substantially equal to those shown in FIG. 2. After step S209, the communication environment is judged based on the communication state of each of the connection confirmation signals on HDMI and DLNA (step S401). According to a result of the judgment, the display device outputs to the playback device an instruction designating an interface considered to transmit video signals under a better communication environment (step S402).

The processing in which the communication environment of each interface is judged to output an instruction designating an interface to transmit video signals may be executed as follows. The function of the processing is disposed in the connection confirmation signal timing judge section 310 of FIG. 6. Or, a processing section for the communication environment of each interface is separately arranged such that the processing is executed in the processing section. Alternatively, the processing is executed by the control section 312.

The instruction designating the interface to transmit video signals is notified to the control section 307 of the playback device by use of an HDMI CEC message or a DLNA message. According to the instruction, the control section 307 issues an instruction regarding the transmission of video signals to the HDMI signal processing section 303 or the DLNA signal processing section 305. Through the operations, it is possible to communicate video signals by using an interface more suitable for the communication environment.

FIG. 8 shows an example of an EDID description to notify that the concurrent usage mode can be coped with, from the display device to the playback device. An item of DLNA_Use indicating whether or not the concurrent usage is possible together with DLNA is disposed at a position of bit 2 of byte 6. The item is set to one if the HDMI/DLNA concurrent usage is possible. If DLNA_Use is set to one, information pieces regarding the concurrent usage are recorded in DLNA_Search_Program, DLNA_Browse_Hierarchy, and DLNA_Play_Position respectively assigned to bits 5 to 7 of byte 9.

In this example, DLNA_Search_Program indicates availability of the recorded program search function on DLNA, DLNA_Browse_Hierarchy indicates availability of the folder hierarchy browse function, and DLNA_Play_Position indicates availability of the playback start position designating function of DLNA.

FIG. 9 shows an example of the description of each of these items. For example, if only the playback start position designating function of DLNA is available, bit 7 is set to one and each of bits 6 and 5 is set to zero. In FIG. 8, three bits of byte 9 are allocated to indicate availability of three functions of DLNA. However, the number of bits is appropriately allocated in consideration of the number of functions supportable in association with control functions of the HDMI CEC line and DLNA.

To notify that the HDMI/DLNA concurrent usage is possible from the display device to the playback device or vice versa, an HDMI CEC message is employed or a DLNA message may be employed. Also in this situation, there are set the signal indicating that the HDMI/DLNA concurrent usage is possible and the signal regarding functions available in the operation. For this purpose, signals similar to those shown in FIG. 9 are used.

Next, description will be given of an example of the display screen of the display device 10. FIG. 10 shows an example of the display screen in a situation in which the time bar is displayed, and the viewer operates via DLNA the function to designate an arbitrary position to start playback and video signals and control instructions are transmitted via HDMI.

After the processing of step S210 of FIG. 2 is finished, when information of a reproducible programming list is received via HDMI from the playback device, the display device displays the information on the screen, and the viewer selects a program to be viewed. The display device then displays a message on the screen, inquiring whether or not the playback position designating function by use of the time bar (a function using DLNA) is employed. In the display operation, serviceability of the user will be improved by displaying events to be taken into consideration when the concurrent usage mode is employed, for example, a warning message indicating that the operation may not be stable depending on the communication environments. When the viewer selects "yes" in FIG. 10, the playback position designating function by use of the time bar is made available on the display screen and then the concurrent usage mode is started.

Through the display operation, it is possible to improve serviceability of the concurrent usage mode.

According to the method described above, when performing cooperative control between video devices by concurrently using a plurality of interfaces, it is possible that a plurality of interfaces securely communicate cooperative control signals with one and the same connection destination and it is possible to identify and to eliminate a signal which is sent from a second device connected to the interfaces and which interferes the cooperative control. Assume that a device other than the device, which is connected to one of the plurality of interfaces and tries to use the plural interfaces, poses as a device to inherently communicate video signals and control information and transmits a connection confirmation signal, it is difficult for the device to transmit the connection confirm signal at appropriate timing since the device cannot obtain information about timing at which the connection confirm signal is transmitted via one of the interfaces.

In the embodiment, the connection confirm signal is not transmitted freely, but is to be transmitted at appropriate timing. Hence, it is possible to confirm with high precision that a plurality of interfaces are connected to one and the same device. It is also possible for each of the devices connected to a plurality of interfaces to confirm whether or not the plural interfaces can be concurrently used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device adapted to connect with a playback device via a first interface and a second interface and to receive video information from the playback device via the first interface or the second interface to display the received video information, comprising:
   a control section configured to instruct a first communication section and a second communication section to repeat a connection confirmation two or more times within a predetermined time interval;
   said first communication section configured to transmit a first connection confirmation signal for confirming a connection with the playback device and receive a response signal in response to the first connection confirmation signal via the first interface;
   said second communication section configured to transmit a second connection confirmation signal for confirming a connection with the playback device and receive a response signal in response to the second connection confirmation signal via the second interface; and
   a display section configured to display the video information;
   wherein, the connection confirmation includes the first communication section receiving the response signal in response to the first connection confirmation signal and the second communication section receiving the response signal in response to the second connection confirmation signal, and wherein when the first and second communication sections repeat the connection confirmation two or more times within the predetermined time interval, the control section controls the display section to display a screen relating to a function which uses one or both of the first interface and the second interface between the display device and the playback device.

2. The display device according to claim 1, wherein the first interface and the second interface are included in one cable.

3. The display device according to claim 2, wherein the one cable is a HDMI cable, the first interface includes a CEC (Consumer Electronics Control) interface and a TMDS (Transition Minimized Differential Signaling) interface for transmitting the video information in TMDS form in the HDMI cable, and the second interface is a HEC (HDMI Ethernet Channel) interface in the HDMI cable.

4. The display device according to claim 1, wherein the screen includes a message for asking a user whether or not to use the function.

5. A display device adapted to receive video information transmitted from a playback device to display the received video information, comprising:
   a control section configured to instruct a first communication section and a second communication section to repeat a connection confirmation two or more times within a predetermined time interval;
   said first communication section configured to transmit a first connection confirmation signal for confirming a connection with the playback device and receive a response signal in response to the first connection confirmation signal via a first interface;
   said second communication section configured to transmit a second connection confirmation signal for confirming a connection with the playback device and receive a response signal in response to the second connection confirmation signal via a second interface;
   a display section configured to display the video information; and
   wherein, the connection confirmation includes the first communication section receiving the response signal in response to the first connection confirmation signal and the second communication section receiving the response signal in response to the second connection confirmation signal, and wherein when the first and second communication sections repeat the connection confirmation two or more times within the predetermined time interval, the control section controls the display section to display a screen relating to a function which uses one or both of the first interface and the second interface between the display device and the playback device.

6. The display device according to claim 1, wherein the first interface and the second interface are included in a predetermined cable.

7. The display device according to claim 6, wherein the predetermined cable is a HDMI cable, the first interface includes a CEC (Consumer Electronics Control) interface and a TMDS (Transition Minimized Differential Signaling) interface for transmitting the video information in TMDS (Transition Minimized Differential Signaling) form in the HDMI cable, and the second interface is a HEC (HDMI Ethernet Channel) interface in the HDMI cable.

8. The display device according to claim 6, wherein the screen includes a message for asking a user whether or not to use the function.

9. A display device adapted to receive video information transmitted from a playback device to display the received video information, comprising:
   a control section configured to instruct a communication section to repeat a connection confirmation two or more times within a predetermined time interval;
   said communication section configured to transmit a first connection confirmation signal for confirming a connection with the playback device and receive a response signal in response to the first connection confirmation signal via a first interface, and to transmit a second connection confirmation signal for confirming a connection with the playback device and receive a response signal in response to the second connection confirmation signal via a second interface;
   a display section configured to display the video information transmitted from the playback device via a third interface; and
   wherein, the connection confirmation includes the communication section receiving the response signal in response to the first connection confirmation signal and the response signal in response to the second connection confirmation signal, and wherein when the communication section repeats the connection confirmation two or more times within the predetermined time interval, the control section controls the display section to display a screen for using a function, which cannot be used under the first interface, under the second interface.

10. The display device according to claim 9, wherein the playback device is connected to the display device by the HDMI cable, the first interface includes a CEC (Consumer Electronics Control) interface in the HDMI cable, the second interface is a HEC (HDMI Ethernet Channel) interface in the HDMI cable, and the third interface is a TMDS (Transition Minimized Differential Signaling) interface for transmitting the video information in TMDS form in the HDMI cable.

11. The display device according to claim 9, wherein the screen includes a message for asking a user whether or not to use the function, which cannot be used under the first interface, under the second interface.

* * * * *